United States Patent [19]

Waggener et al.

[11] Patent Number: 4,733,823

[45] Date of Patent: Mar. 29, 1988

[54] SILICON NOZZLE STRUCTURES AND METHOD OF MANUFACTURE

[75] Inventors: Herbert A. Waggener, Lincolnshire; Joseph C. Zuercher, Wilmette, both of Ill.

[73] Assignee: AT&T Teletype Corporation, Skokie, Ill.

[21] Appl. No.: 922,643

[22] Filed: Oct. 24, 1986

Related U.S. Application Data

[63] Continuation of Ser. No. 661,005, Oct. 15, 1984, abandoned.

[51] Int. Cl.[4] ...................... A62C 31/02; G01D 15/18

[52] U.S. Cl. ...................................... 239/601; 346/75; 156/644; 156/647

[58] Field of Search ............... 239/601, 589, 591, 592; 346/75; 156/644, 647

[56] References Cited

U.S. PATENT DOCUMENTS

| | | | |
|---|---|---|---|
| 3,921,916 | 11/1975 | Bassous | 239/601 |
| 3,949,410 | 4/1976 | Bassous et al. | 346/75 |
| 3,958,255 | 5/1976 | Chiou et al. | 239/601 X |
| 4,007,464 | 2/1977 | Bassous et al. | 239/601 X |
| 4,014,029 | 3/1977 | Lane et al. | 239/601 X |
| 4,169,008 | 9/1979 | Kurth | 346/75 X |

OTHER PUBLICATIONS

Leone et al., "Fabricating Shaped Grid and Aperture Holes", IBM Tech. Disclosure Bul., vol. 14, No. 2, pp. 417-418; 7-1971.

Kuan et al., "Two-Sided Groove Etching Method to Produce Silicon Ink Set Nozzles", IBM TDB, vol. 21, No. 6, pp. 2585-2586; 11-1978.

*Primary Examiner*—Joseph F. Peters, Jr.

*Assistant Examiner*—James M. Kannofsky

*Attorney, Agent, or Firm*—A. A. Tirva

[57] ABSTRACT

A nozzle structure in a crystallographically oriented, monocrystalline silicon includes a pyramidal opening anisotropically etched from the entrance side of the nozzle and truncated in a membrane having a smaller cross-section than the initial cross-section of the entrance opening. The membrane has extending therethrough a pyramidal opening etched anisotropically from the exit side. The vertical axes of both openings are substantially concentric.

2 Claims, 8 Drawing Figures

SILICON NOZZLE STRUCTURES AND METHOD OF MANUFACTURE

This is a continuation of application Ser. No. 661,005, filed Oct. 15, 1984, now abandoned.

TECHNICAL FIELD

Monocrystalline silicon bodies with passages.

BACKGROUND OF THE INVENTION

In the prior art and specifically in U.S. Pat. No. 3,921,916 it is suggested that a monocrystalline crystallographically oriented silicon wafer may be selectively etched to form one or more reproducible channels of a specific form in the wafer body. The specific type of the channel described in that patent has a rectangular entrance cross-section which continues to an intermediate rectangular cross-section, smaller than the entrance cross-section, and thento an exit cross-section which has a shape other than rectangular. A channel of this specific type is established by either of two disclosed processes, both of which utilize a heavily doped p+ layer (patterned in the one process and unpatterned in the other) as an etchant barrier. In the two processes, a silicon wafer is heavily doped to place it near or at saturation from one major face to form the p+ etchant barrier. Therefore, patterned anisotropic etching from the opposite major face proceeds until the p+ barrier is reached. The anisotropic etching results in a rectangular entrance cross-section and a rectangular intermediate cross-section defining a membrane smaller in size than the entrance cross-section.

In the application of one process, the etching process is continued from the entrance side until an opening is made through the membrane. The other process utilizes patterned isotropic etching from the opposite side (exit side) of the nozzle to complete a passage through the membrane to the intermediate cross-section.

Although these prior art processes may provide satisfactory ink jet nozzle structures, both of the described processes and the resulting structures have inherent problems. For example, due to inherent wafer thickness variations and isotropic etch nonuniformities, these processes require extensive mechanical and/or chemical polishing of both major surfaces of the wafer to improve dimensional control of the resulting nozzle structures. This is a costly processing step. Additionally, the nozzle structures produced by these processes have heavily saturated p+ regions surrounding the exit openings, and these regions tend to be brittle and thus subject to failure when exposed to high fluid pressures or pressure transients typically present in ink jet printing systems.

DISCLOSURE OF THE INVENTION

In accordance with the present invention, a standard commercially available semi-conductor wafer of crystallographically oriented, monocrystalline p-type silicon is used to produce a single fluid nozle or an array of nozzles directly and without the need for mechanical or chemical polishing of the two major surfaces of the wafer by a process wherein a low saturation n surface layer is formed on at least one major surface of the wafer. Materials resistant to an anisotropic etchant, later employed, are then deposited on both surfaces of the wafer. Thereafter, aperture masks defining the entrance and exit areas of a nozzle are formed on these major surfaces and the exit area is coated with a material which is both resistant to an etching solution and which provides an electrical connection to the n layer. A cavity is anisotropically etched from the entrance area of the wafer through to the n layer at the exit side by immersing the wafer in a caustic etching solution. A potential applied across the p/n junction at the exit side of the wafer electrochemically stops the etching action leaving a membrane having a thickness substantially equal to the n-layer. A passage is then anisotropically etched through the membrane from the exit side to complete the nozzle structure.

THE DRAWINGS

DETAILED DESCRIPTION

In multi-nozzle ink jet printing systems utilizing nozzles made of semi-conductor material, some of the more important characteristics required of the nozzle are the uniformity in the size of each respective nozzle, spatial distribution of the nozzles in an array, their resistance to cracking under the fluidic pressures encountered in the system, provision of an efficient mechanical impedance match between the fluid supply and the exit opening, as well as, their resistance to wear caused by the high velocity fluid flow through the nozzle structure.

Figure 1:
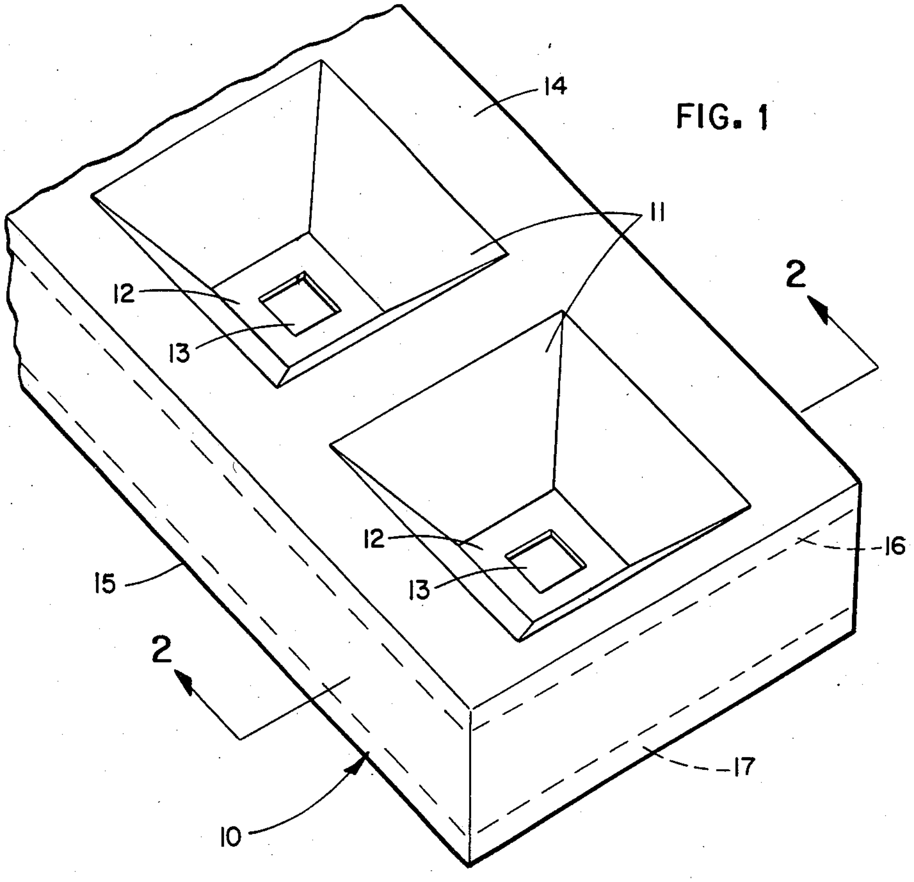
FIG. 1 shows a perspective view of a portion of the nozzle structure in accordance with the present invention.
Figure 2:
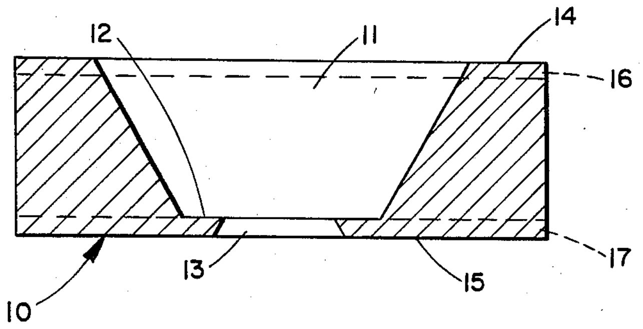
FIG. 2 shows a cross-sectional view of the nozzle structure taken along line 2—2 of FIG. 1.

Referring now to FIG. 1, there is shown a portion of the nozzle structure made in accordance with the present invention. Specifically a substrate 10 is shown having an array of uniform openings 11 therein. Each opening 11 starts with an initial, substantially square area and tapers to and terminates in a substantially square area smaller than the initial square area defining a membrane 12. As shown in FIG. 2, each membrane 12 in turn has an opening 13 extending therethrough which starts in a substantially square area smaller than the square area of each respective membrane 12 and terminates in a substantially square area larger than the starting square area of said opening. Both horizontal axes of the openings 13 in the membrane 12 are substantially aligned with the horizontal axes of each corresponding opening 11 in the mainbody of the wafer 10 by virtue of the wafer 10 crystallography.

Figure 3:
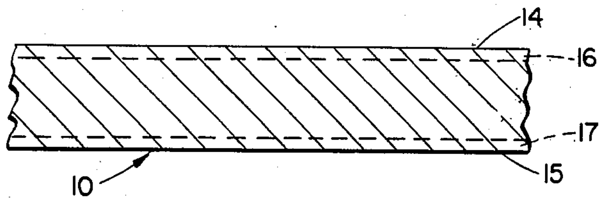
FIGS. 3 through 8 illustrate sequential crosssectional views of a silicon wafer processed in accordance with the present invention.

FIGS. 3 through 8 illustrate a sequence of process steps for production of an aperture in a single crystal silicon wafer 10 for forming one fluid nozzle or an array of nozzles. It is to be understood that the following process steps may be used in a different sequence and that other film materials for performing the same functions described below may be used. Furthermore, film formation, size, thickness and the like, may also be varied. The wafer 10 is of single crystal (100) oriented p type silicon with electrical resistivity of 0.5 to 10 ohm-cm, approximately 19.5 to 20.5 mils thick having front 14 and back 15 surfaces. The (100) planes are parallel to surfaces 14 and 15. As shown in FIG. 3, phosphorous is diffused into the front 14 and back 15 surfaces of the silicon wafer 10 to a depth of about 5 microns forming n type layers 16 and 17. As will become obvious later only one diffused layer is required to form a nozzle structure by the process (exit side). The diffusion is accomplished in a well-known manner by having a gas mixture containing 0.75% $PH_3$, 1%$_2$0, and the make-up of Ar and $N_2$ flow for 30 minutes past the silicon wafer 10 which is maintained at 950° C. This is followed by a long drive-in period (1050° C. for 22 hours) to achieve a thick layer (about 5 microns). Since the final concentration of phosphorous in the n layers 16 and 17 is very low, this diffusion step introduces very little stress into the silicon wafer 10, and consequently the silicon structure retains its strength.

Figure 4:
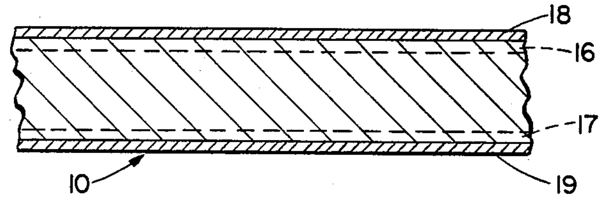

Next as shown in FIG. 4, both front 14 and back 15 surfaces of the wafer 10 are coated with a protective material such as LPCVD silicon nitride forming layers 18 and 19 which can resist a long etching period in a caustic (KOH) solution. One of the ways to accomplish this is to utilize a low pressure chemical vapor deposition of silicon nitride deposited at about 800° C. Oxide layers (not shown) less than 0.5 microns thick may be grown on both sides of layers 18 and 19 to reduce the effect of stress between nitride and silicon and to improve adhesion of photoresist to nitride. To promote ease of photoshaping it is recommended that the wafer 10 when procured have its back surface 15 etched in an acidic rather than caustic solution.

Figure 5:
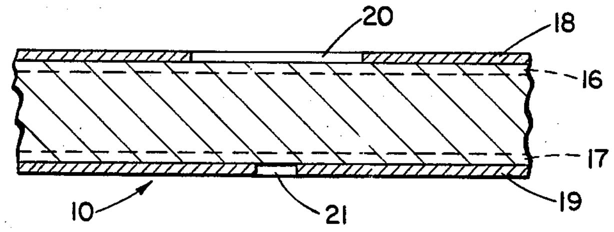

Thereafter, masks are prepared corresponding to the desired entrance 20 and exit 21 areas of the nozzle. The masks for both entrance 20 and exit 21 areas are made circular in shape since the openings in the silicon wafer 10 defined by circular masks will etch out to squares parallel to the 100 planes, each square circumscribing its respective circle. Use of circular masks eliminates possible error due to the theta misalignment which may occur when a square shaped mask is used. The silicon nitride layers 18 and 19 are photoshaped simultaneously on both sides using a two-sided photospinner (not shown) and a two-sided aligner (not shown). The resulting structure after etching away of portions of layers 18 and 19 defining the entrance 20 and exit 21 areas, is shown in FIG. 5.

Figure 6:
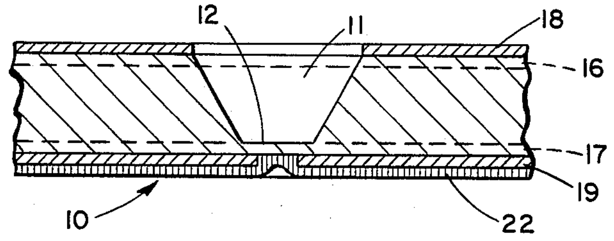

The exit area 21 is then protected from the etching solution by covering it with a metallic layer 22, as shown in FIG. 6, or by use of a hermetic mechanical fixture (not shown). Thereafter the wafer is submerged in a hot (80°-85° C.) KOH solution (not shown) and a potential is placed across the p/n junction at the back side 15 by connecting the positive side of an electrical power source (not shown) with the metallic layer 22 protecting the exit area 21. Other alkaline etch solutions such as metal hydroxides of the Group I-A elements of the Periodic Table, for example, NaOH, $NH_4OH$, or others, may be used. The use of electrochemically controlled thinning process for semi-conductors is well-known in the art and is described in detail in U.S. Pat. No. 3,689,389 granted to one of the applicants in the present application.

The opening 11 in the monocrystalline silicon wafer 10 is etched anisotropically until the diffused layer 17 at the back side 25 is reached, at which time the etching action stops due to an oxide layer (not shown) which is caused to grow at the p/n junction due to the applied potential across the junction. It is well known in the art that the (111) plane is a slow etch plane in monocrystalline silicon material when a KOH etching solution is used. Thus, the etching step produces a pyramidal opening in wafer 10 which opening truncates in a membrane 12 when it encounters the electrochemical etch barrier set up at the silicon and diffused layer 17 interface (p/n junction).

Figure 7:
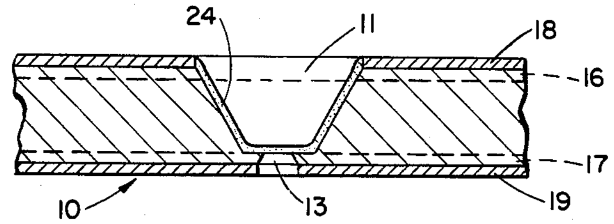

Thereafter, the wafer 10 is removed from the etching solution, the protective metallic layer 22 and associated electrical conn ction on the exit side are removed, and the entrance side 20 is protected from the etching solution usually by a layer 24 formed by air oxidation. The wafer 10 is then re-submerged into the etching solution and a pyramidal passage is etched anisotropically from the back surface 15 to form the exit opening 13. The resulting structure is shown in FIG. 7.

Figure 8:
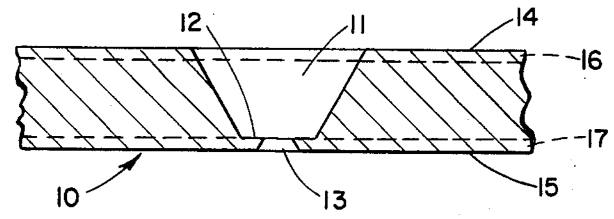

If desired, the protective coatings 18, 19 and 24 are then removed leaving a completed pure silicon nozzle structure as shown in FIG. 8. Typically the initial opening of the entrance 20 is about 35 mils wide and the smallest portion of the exit opening 13 is about 1.5 to 4 mils wide.

Since the etch rate perpendicular to the (111) planes is very low compared to the vertical etch rate (100), overetch does not mitigate against the high accuracy defined by the exit mask. To prevent ink from wetting the surface of the wafer on the exit side, the back surface 15 of the wafer 10 may be coated with a material of low surface energy such as Teflon.

What is claimed is:

1. A nozzle comprising:

a unitary nozzle body formed of a p type monocrystalline silicon having a substantially square entrance aperture of a first cross-sectional area which tapers to a second substantially square cross-sectional area which is smaller than the first cross-sectional area of said entrance aperture; and a membrane of n type monocrystalline silicon having a thickness of 10 microns or less formed within said second cross-sectional area, said membrane having a singular substantially square exit aperture therein, said exit aperture having a first cross-sectional area which is smaller than said second cross-sectional area of said entrance aperture and which tapers from said second cross-sectional area of said entrance aperture to a second cross-sectional area of said exit apeture, said exit aperture first cross-sectional area being smaller than said second cross-sectional area thereof, said cross-sections being substantially parallel to the (100) planes of the monocrystalline silicon and said entrance and exit apertures being substantially concentric.

2. A nozzle comprising:

a nozzle body formed of cyrstallographically oriented, p type monocrystalline silicon section having first and second major surfaces;

an n type layer formed on the first major surface of said section;

said section having a pyramidal cavity anisotropically etched from the second major surface of said section to said n layer, said cavity having a rectangular entrance of a first cross-sectional area which tapers to a second rectangular cross-sectional area which is smaller than the first cross-sectional area; and said n layer having an exit aperture anisotropically etched from the first major surface of said section wherein the exit aperture has a first cross-sectional area which is smaller than the second cross-sectional area of the pyramidal cavity and wherein said first cross-sectional area of the exit aperture tapers to a second cross-sectional area which is larger than the first cross-sectional area of the said exit aperture.

* * * * *

UNITED STATES PATENT AND TRADEMARK OFFICE
CERTIFICATE OF CORRECTION

PATENT NO. : 4,733,823

DATED : March 29, 1988

INVENTOR(S) : Herbert A. Waggener, Joseph C. Zuercher

It is certified that error appears in the above-identified patent and that said Letters Patent is hereby corrected as shown below:

Column 1, line 20, "thento" should read --then to--,
line 28, "Therefore" should read --Thereafter--,
Column 2, line 18, "shows" should read --is--,
Column 4, line 5, "conn ction" should read --connection--,
line 8, "re-submerged" should read --re-submersed--.

In the claims, Column 4, claim 1, line 41, "apeture" should read --aperture--.

Signed and Sealed this

Twenty-first Day of May, 1991

*Attest:*

HARRY F. MANBECK, JR.

*Attesting Officer*

*Commissioner of Patents and Trademarks*